United States Patent [19]
Crellin, Jr.

[11] 3,785,584
[45] Jan. 15, 1974

[54] SNAP LOCK ASSEMBLY
[75] Inventor: John R. Crellin, Jr., Spencertown, N.Y.
[73] Assignee: Albany International Corp., Albany, N.Y.
[22] Filed: Nov. 17, 1971
[21] Appl. No.: 199,621

[52] U.S. Cl......... 242/118.6, 242/118.1, 242/118.7, 285/DIG. 22, 287/20 R, 287/52.03
[51] Int. Cl............................................ B65h 75/14
[58] Field of Search................... 242/118.6, 118.61, 242/118.7, 118.8, 118.4, 118.5, 118.1, 118.11, 118, 118.62, 71.8, 77.3, 77.4; 287/20 R, 52.03; 285/162, 82, 81, DIG. 22

[56]  References Cited
UNITED STATES PATENTS
3,552,677  1/1971  Hacker .......................... 242/118.61
3,642,223  2/1972  Feichtinger ..................... 242/118.4

FOREIGN PATENTS OR APPLICATIONS
956,829  4/1964  Great Britain ................... 242/118.7

Primary Examiner—George F. Mautz
Attorney—David S. Kane et al.

[57]  ABSTRACT

A first member has spaced openings formed therein, said openings each being defined by a rigid portion on one side and the end of a resilient tongue on the other side. Each rigid portion includes a beveled leading edge surface and an inner surface that terminates forming a gripping shoulder. A second member has yieldable projections formed and arranged for engagement with an insertion into the openings of the first member. Each projection has an enlarged end portion defined by an inclined surface formed on a side of the projection adjacent a rigid portion of the first member. The inclined surface terminates abruptly to form a lip for engaging the gripping shoulder of the first member. After insertion of the projections into the openings, the lips engage the gripping shoulders and the resilient tongues engage the projections on a side opposite the inclined surface to prevent disengagement of the lips and gripping shoulders and removal of the projections.

7 Claims, 7 Drawing Figures

PATENTED JAN 15 1974 3,785,584
SHEET 1 OF 2
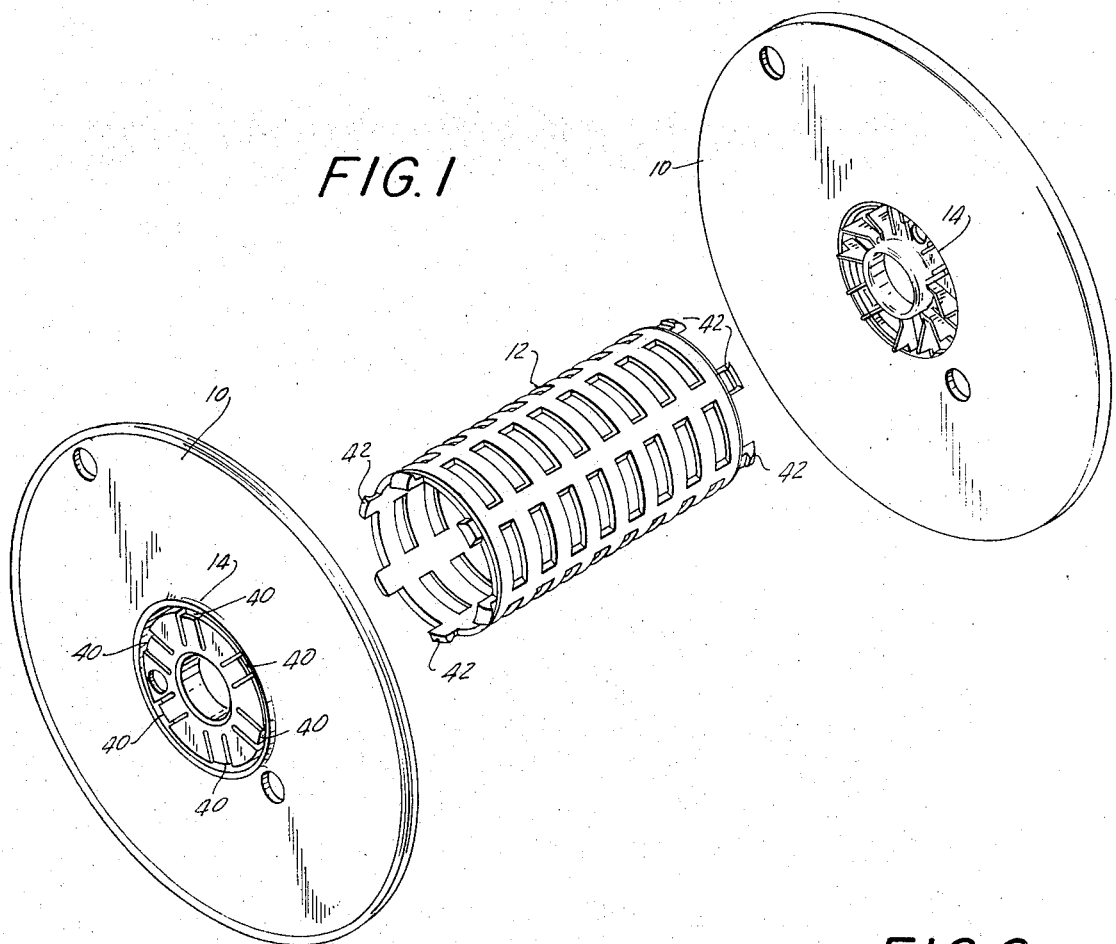
FIG.1
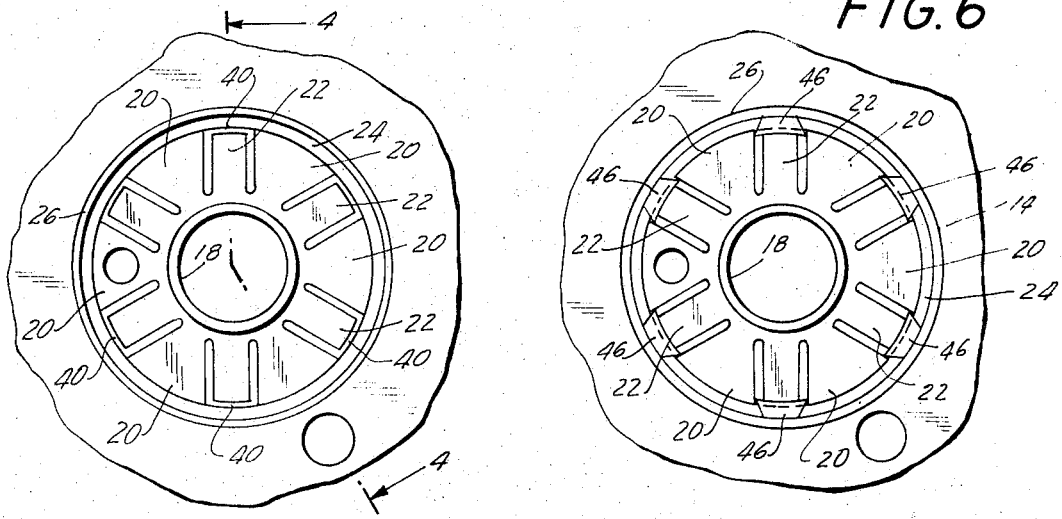
FIG.5
FIG.6

SNAP LOCK ASSEMBLY

BACKGROUND OF THE INVENTION

1. Field of the Invention

This invention relates to connecting means and more particularly to a connecting means having a locking action to prevent disconnection.

2. Description of the Prior Art

Heretofore, various means have been employed for connecting components of mechanical assemblies such as the barrel and flanges of a spool. The most common connecting methods were adhesive cementing or solvent welding, however; these operations were limited to certain special plastic materials. In some cases the most desirable material could not be used because it was not practical. The aforementioned operations require the use of materials which pose a fire hazard and sometimes involve noxious fumes; also, the resulting assembled part is not subject to immediate use because the joint must be given time to dry in order to develop full strength. This may take as long as two or three days resulting in considerable inventory of curing parts which during this time give off the flammable and noxious fumes. Nevertheless, many types of materials have been used with success using these methods.

It is also known that spin welding may be used for assembling some circular jointed parts, however, this requires expensive machinery and fixturing.

Sonic welding is also a method which may be used to assemble plastic parts but this also requires extensive fixturing and costly sonic vibration generators. This method suffers the added disability that some parts and materials do not respond well to the sonic method.

In order to overcome the disadvantages of the previously mentioned connecting means, components were molded with connecting arrangements that did not require extensive and costly machinery, substantial operator skill, solvents or adhesives. Most of these connecting arrangements required a first motion to engage a connecting means and a second motion to lock the connecting means. In one such device, projections from a first member were inserted into receiving means in a second member and thereafter the members were rotated to engage a locking means. Undoubtedly, this type of device provided an improved connection; however, the assembly procedure required a two-step operation. The members were first pressed together and then rotated relative to each other. This type of connecting device was limited to assemblies wherein the connecting device could be arranged in a circular pattern to provide for relative rotation. Thus, this type of device could not be conveniently used where square or rectangular shaped components were used.

SUMMARY OF THE INVENTION

The present invention contemplates a connecting assembly having means for locking the connecting assembly to prevent separation of the connected components. Connection is made by merely pressing one component into another, and the connection does not require a second locking motion or the use of extensive and costly machinery, substantial operator skill, solvents or adhesives.

Spaced slots are formed in one of two members to be connected and the other member has projections formed and arranged for insertion into the slots of the first member. Each slot in the first member is defined on one side by the end of a resilient tongue and on the other side by a rigid portion having a beveled leading edge surface and an inner surface, which terminates abruptly to form a gripping shoulder. Each projection of the second member has an enlarged end portion on one side defined by an inclined surface rising from the outermost end of the projection and by a lip spaced inwardly from the outermost end of the projection.

Strengthening ribs are formed adjacent each resilient tongue to increase the strength of the first member in the areas adjacent the tongues. Formed on and extending from the strengthening ribs are fin like members, which engage and support the second member to prevent excessive strain from being exerted upon the projections of the second member when a force is applied to either of the members.

The connection between the first and second members is made by merely pressing the projections of the second member into the slots of the first member. Initially, the inclined surfaces of the second member engage the beveled surfaces of the first member forcing the projections to yield in a direction so as to engage the resilient tongues which bend until the inclined surfaces of the second member clear the gripping shoulders of the first member so that the lips of the second member engage the shoulders of the first member, at which point the projections recover to their normal unyielded position and the resilient tongues snap in place engaging a side of each projection opposite the inclined surface. The tongues prevent the projections from bending and assure a continuous engagement of the lip with the gripping shoulder of the first member.

The primary objective of the present invention is to provide a connecting device including a locking means.

Another objective of the present invention is to provide a connecting device, wherein connection is made by merely pressing one member into a second member.

Another objective of the present invention is to provide a connection between components of an assembly that does not require the use of extensive and costly machinery, substantial operator skill, solvents or adhesives.

Another objective of the present invention is to provide a connection for components of an assembly that may be easily molded from plastic.

The foregoing objectives and advantages of the invention will appear more fully hereinafter from a consideration of a detailed description which follows, taken together with the accompanying drawings, wherein one embodiment of the invention is illustrated by way of example. It is to be expressly understood, however, that the drawings are for illustrative purposes only and are not to be considered as defining the limits of the invention.

DESCRIPTION OF THE DRAWINGS

FIG. 1 is a perspective assembly drawing showing a spool having a barrel and flanges connected by a device constructed in accordance with the laws of the present invention.

FIG. 5 is a fragmentary sectional view taken along lines 4—4 of FIG. 2 and showing the components being connected.

FIG. 6 is a fragmentary view similar to that of FIG. 5 showing the components after they are connected.

DESCRIPTION OF THE INVENTION

The present invention will be described in connection with a spool assembly, wherein flanges 10 are connected to the ends of barrel 12. The flanges and barrel are molded from a plastic material in a manner well known in the art. Flanges 10 are circular having a hub portion 14 located centrally thereof.

Figure 2:
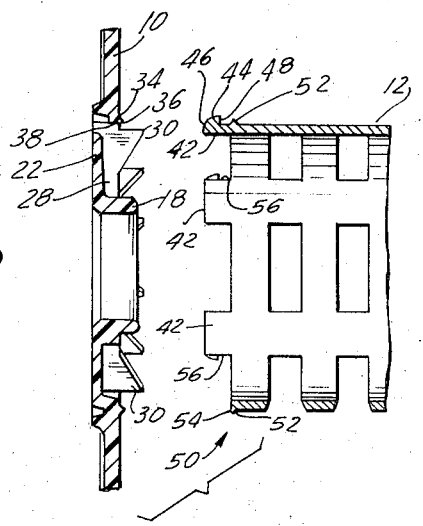
FIG. 2 is a fragmentary plan view of a portion of the flange of FIG. 1 as seen looking towards the spool.

Referring to FIG. 2, the hub portion 14 has an inner cylindrical sleeve 18 and a plurality of triangular spokes 20 radiating therefrom. Disbursed between triangular spokes 20, are tongue members 22 connected to the hub adjacent the sleeve and extending radially therefrom. Tongues 22 are molded to have a thickness that renders them substantially resilient. Spokes 20 are connected to an annular shoulder 24, which is surrounded by a protective wall 26, the purpose of which will be discussed subsequently.

Figure 3:
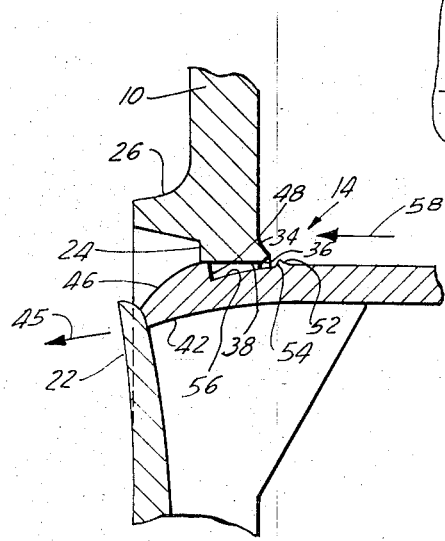
FIG. 3 is a fragmentary plan view of a portion of the flange as shown in FIG. 2 looking from the barrel.
Figure 4:
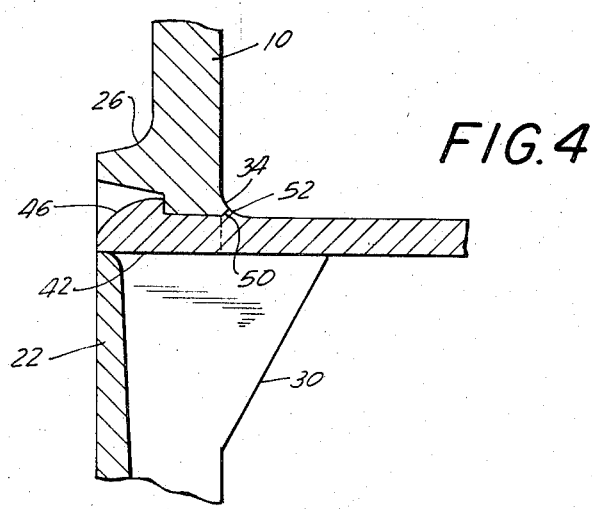
FIG. 4 is a sectional view taken along line 4—4 of FIG. 2.

Referring now to FIGS. 3 and 4, triangular spokes 20 are shown connecting sleeve 18 to the main body of flange 10 and tongues 22 are shown radiating outward from sleeve 18 between each of said triangular spokes. Reinforcing ribs 28 are formed along the edges of triangular spokes 20 to provide added strength between sleeve 18 and the main body of flange 10. Triangular shaped fins 30 are formed integrally with strengthening ribs 28 and extend outwardly in the same direction as sleeve 18. Strengthening posts 32 are formed at the apex of the triangular spokes 20 for providing added strength at the tip of the spokes.

Referring to FIGS. 3, 4 and 5, the inside of the flange has a flared annular ridge formed around the periphery of the hub portion 14 by a curved surface 34 and a beveled surface 36. Segments 38, of a cylindrical surface, are formed between triangular spokes 20 and connect beveled surface 36 and shoulder 24. Segments 38 and the ends of resilient tongue members 22 define arcuate slots 40 for receiving projections 42 formed on barrel 12.

Referring to FIGS. 1, 3, 4 and 5, barrel 12 has projections 42 extending from each end thereof and positioned for insertion into slots 40 of flanges 10. Barrel 12 is molded from a resilient plastic material so that projections 42 are yieldable and may be bent towards the center of barrel 12. Each projection has an enlarged portion 44 formed on one side thereof and defined by an inclined or curved surface 46 rising from the outermost edge of a projection 42 and by lip 48 spaced from the edge of the projection. A flared circumferential ridge 50 is formed about the periphery of barrel 12 by a curved surface 52 and a beveled surface 54. Ridge 50 is spaced from lips 48 to define segments 56 of a cylindrical surface so that lips 48, beveled surface 54 and segments 56 complement shoulder 24, beveled surface 36 and segments 38 of flanges 10.

Figure 7:
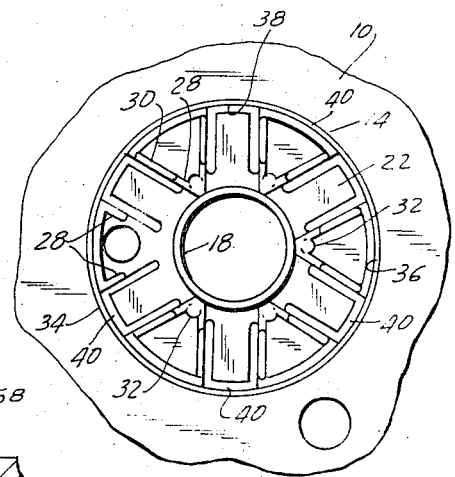
FIG. 7 is a plan view similar to FIG. 2 but shown after connection of the barrel to the flange.

The spool is assembled by aligning projections 42 of barrel 12 with slots 40 of flange 10 and by pushing barrel 12 in a direction as indicated by arrow 58 in FIG. 5. Curved surfaces 46 cooperate with beveled surface 36 of flange 10 to bend projections 42 radially inward so that the ends of projections 42 engage tongues 22, which yield in the direction of arrow 45. When curved surfaces 46 and lips 48 pass the cylindrical surfaces 38, projections 42 recover and return to their normal unbent positions so that lips 48 engage shoulder 24 and curved surfaces 34 and 52 form a smooth fillet between the barrel and flange as shown in FIGS. 6 and 7. When projection 42 returns to its unbent position, resilient tongues 22 snap back to their normal positions and engage the interior surfaces of projections 42 opposite curved surfaces 46 to prevent projections 42 from again bending inwardly. Thus, it may be seen that tongues 22 lock projections 42 in position so that lips 48 engage shoulder 24 preventing the removal of barrel 12 from flange 10.

Outwardly extending protective wall 26 protects projections 42 and tongues 22 from damage that may result from a blow directed towards the outside of flange 10 and also functions as a guard to prevent projections 42 from catching other objects. Fins 30 extend into barrel 12 for supporting the barrel and for relieving the strain that may be exerted on the projections 42 should a force be exerted on either barrel 12 or flange 10.

Thus, the present invention provides a device for connecting component parts of a spool without the need for adhesive and also provides a locking means to prevent subsequent detachment of the connected parts. Connection is accomplished by merely pressing one member into another and a separate locking procedure is not required. Assembly time is reduced by the elimination of the locking procedure and by the elimination of the need of adhesive which requires extensive drying time or the application of heat. Strengthening fins are provided to relieve the strain that would normally be exerted on the connected means. The components are easily molded from plastic material.

While the invention as described was in a spool embodiment, the teachings of this invention may be easily applied to other types of assemblies where components are to be connected together, including components having other than circular shapes, components which cannot be rotated relative to each other and components formed of materials differing in composition and characteristics.

What is claimed is:

1. A locking assembly for connecting first and second members, comprising:

at least one opening formed in the first member, said opening being defined partially by a rigid edge portion and partially by an end of a resilient tongue formed opposite the rigid edge portion;

a yieldable projection formed on said second member and disposed within the opening of the first member, so that the resilient tongue of the first member engages the projection of the second member; and engaging means, formed on the side of the projection adjacent the rigid edge portion, for engaging the rigid edge portion of the first member and connecting the first and second members, whereby said yieldable projection and resilient tongue interact and bend to facilitate insertion of the projection into the opening and thereafter recover so that the engaging means engage the rigid edge portion and the tongue engages the projection rendering the projection non-yieldable and thereby locking the engaging means in an engaged position.

2. A locking assembly as described in claim 1, wherein the rigid edge portion includes a beveled edge surface which cooperates with the yieldable projection to facilitate insertion of the projection into the opening.

3. A locking assembly as described in claim 1, additionally comprising:
a support member formed adjacent the resilient tongue of said first member and extending towards the second member, so that said support member engages said second member at a position along side of the projection and provides support for said second member thereby preventing excessive force from being exerted on the projection of the second member and the resilient tongue of the first member when an external force is applied to either of the first or second members.

4. A locking assembly for connecting first and second members, comprising:
a plurality of rigid edge portions spaced apart and formed in said first member;
resilient tongue structures formed integrally with said first member and having ends spaced from the rigid edge portions so that openings are defined by the rigid edge portions and the ends of the tongue structures;
yieldable projections formed and arranged on said second member for insertion into the openings of the first member;
an enlarged portion formed at the end of each projection on a side adjacent a rigid edge portion; and
means formed in said rigid edge portions for receiving the enlarged portions after the projections are inserted into the openings, whereby the enlarged portions engage the rigid edge portions to connect the first and second members and the resilient tongues engage the yieldable projections on sides opposite the enlarged portions to prevent disengagement of the enlarged portions from the rigid edge portions.

5. A locking assembly as described in claim 4, wherein each rigid edge portion includes a forward surface and each enlarged portion includes an inclined surface, said surfaces cooperating to facilitate insertion of the projections into the openings.

6. A spool including a pair of flanges and a cylindrical barrel, wherein the improvement comprises:
a plurality of spaced arcuate slots formed about a circle in each of the flanges, the slots being defined on one side by rigid edge portions and on the other side by the ends of resilient tongue structures positioned radially inward from said rigid edge portions;
yieldable arcuate projections formed and arranged about each end of the barrel for insertion into the slots of the flanges;
enlarged portions formed at the ends of the projections and on sides of the projections adjacent the rigid edge portions; and
receiving means formed in said rigid edge portions for receiving the enlarged portions after the projections are inserted into the openings, whereby the enlarged portions engage the rigid edge portions to connect the flanges to the barrel and the resilient tongue structures engage the projections on sides opposite the enlarged portions to prevent disengagement of the enlarged portions from the rigid edge portions.

7. A spool including a pair of flanges and a cylindrical barrel, wherein the improvement comprises:
a plurality of spaced arcuate slots formed about a circle in each of the flanges, the slots being defined on one side by rigid edge portions and on the other side by the ends of resilient tongue structures positioned radially inward from said rigid edge portions;
strengthening members formed on said flanges adjacent the resilient tongue structures to provide added flange strength adjacent said tongues;
yieldable arcuate projections formed and arranged about each end of the barrel for insertion into the slots of the flanges;
enlarged portions formed at the ends of the projections and on sides of the projections adjacent the rigid edge portions; and
receiving means formed in said rigid edge portions for receiving the enlarged portions after the projections are inserted into the openings, whereby the enlarged portions engage the rigid edge portions to connect the flanges to the barrel and the resilient tongue structures engage the projections on sides opposite the enlarged portions to prevent disengagement of the enlarged portions from the rigid edge portions.

* * * * *